United States Patent
Tsai

(10) Patent No.: US 8,427,771 B1
(45) Date of Patent: Apr. 23, 2013

(54) HYBRID DRIVE STORING COPY OF DATA IN NON-VOLATILE SEMICONDUCTOR MEMORY FOR SUSPECT DISK DATA SECTORS

(75) Inventor: Chun Sei Tsai, Tustin, CA (US)

(73) Assignee: Western Digital Technologies, Inc., Irvine, CA (US)

(*) Notice: Subject to any disclaimer, the term of this patent is extended or adjusted under 35 U.S.C. 154(b) by 177 days.

(21) Appl. No.: 12/909,695

(22) Filed: Oct. 21, 2010

(51) Int. Cl.
*G11B 27/36* (2006.01)
*G11B 5/09* (2006.01)
*G06F 13/00* (2006.01)
*G06F 13/28* (2006.01)

(52) U.S. Cl.
USPC ............................... 360/31; 360/53; 711/112

(58) Field of Classification Search .................. None
See application file for complete search history.

(56) References Cited

U.S. PATENT DOCUMENTS

| | | | |
|---|---|---|---|
| 5,333,138 A | 7/1994 | Richards et al. |
| 5,581,785 A | 12/1996 | Nakamura et al. |
| 5,586,291 A | 12/1996 | Lasker et al. |
| 6,044,439 A | 3/2000 | Ballard et al. |
| 6,115,200 A | 9/2000 | Allen et al. |
| 6,275,949 B1 | 8/2001 | Watanabe |
| 6,429,990 B2 | 8/2002 | Serrano et al. |
| 6,661,591 B1 | 12/2003 | Rothberg |
| 6,662,267 B2 | 12/2003 | Stewart |
| 6,687,850 B1 | 2/2004 | Rothberg |
| 6,754,021 B2 | 6/2004 | Kisaka et al. |
| 6,807,630 B2 | 10/2004 | Lay et al. |
| 6,909,574 B2 | 6/2005 | Aikawa et al. |
| 6,968,450 B1 | 11/2005 | Rothberg et al. |
| 7,017,037 B2 | 3/2006 | Fortin et al. |
| 7,028,174 B1 | 4/2006 | Atai-Azimi et al. |
| 7,082,494 B1 | 7/2006 | Thelin et al. |
| 7,107,444 B2 | 9/2006 | Fortin et al. |
| 7,120,806 B1 | 10/2006 | Codilian et al. |
| 7,142,385 B2 | 11/2006 | Shimotono et al. |
| 7,174,478 B2 | 2/2007 | Asano |
| 7,334,082 B2 | 2/2008 | Grover et al. |
| 7,395,452 B2 | 7/2008 | Nicholson et al. |
| 7,411,757 B2 | 8/2008 | Chu et al. |
| 7,461,202 B2 | 12/2008 | Forrer, Jr. et al. |
| 7,472,219 B2 | 12/2008 | Tamura et al. |
| 7,472,222 B2 | 12/2008 | Auerbach et al. |
| 7,477,477 B2 | 1/2009 | Maruchi et al. |
| 7,509,471 B2 | 3/2009 | Gorobets |
| 7,516,346 B2 | 4/2009 | Pinheiro et al. |
| 7,610,438 B2 | 10/2009 | Lee et al. |
| 7,613,876 B2 | 11/2009 | Bruce et al. |
| 7,644,231 B2 | 1/2010 | Recio et al. |

(Continued)

OTHER PUBLICATIONS

U.S. Appl. No. 12/720,568, filed Mar. 9, 2010, 22 pages.

(Continued)

*Primary Examiner* — Regina N Holder

(57) ABSTRACT

A hybrid drive is disclosed comprising a head actuated over a disk comprising a plurality of data sectors, and a non-volatile semiconductor memory (NVSM) comprising a plurality of memory segments. A read command is received from a host to read data from a first data sector. Data is read from the first data sector during a first read operation and a determination is made as to whether the first data sector is suspect. When the first data sector is suspect, the data is written to a first memory segment of the NVSM.

21 Claims, 4 Drawing Sheets

U.S. PATENT DOCUMENTS

| | | | |
|---|---|---|---|
| 7,685,360 | B1 | 3/2010 | Brunnett et al. |
| 7,752,491 | B1 | 7/2010 | Liikanen et al. |
| 8,194,340 | B1 | 6/2012 | Boyle et al. |
| 2006/0195657 | A1 | 8/2006 | Tien et al. |
| 2008/0040537 | A1 | 2/2008 | Kim |
| 2008/0059694 | A1 | 3/2008 | Lee |
| 2008/0130156 | A1* | 6/2008 | Chu et al. ............ 360/71 |
| 2008/0177938 | A1 | 7/2008 | Yu |
| 2008/0222353 | A1 | 9/2008 | Nam et al. |
| 2008/0244188 | A1 | 10/2008 | Yoshida |
| 2008/0256287 | A1 | 10/2008 | Lee et al. |
| 2008/0307270 | A1 | 12/2008 | Li |
| 2009/0019218 | A1 | 1/2009 | Sinclair et al. |
| 2009/0031072 | A1 | 1/2009 | Sartore |
| 2009/0103203 | A1 | 4/2009 | Yoshida |
| 2009/0106518 | A1 | 4/2009 | Dow |
| 2009/0144501 | A2 | 6/2009 | Yim et al. |
| 2009/0150599 | A1 | 6/2009 | Bennett |
| 2009/0172324 | A1 | 7/2009 | Han et al. |
| 2009/0182933 | A1* | 7/2009 | Jang et al. ............ 711/103 |
| 2009/0204852 | A1* | 8/2009 | Diggs et al. ............ 714/42 |
| 2009/0249168 | A1 | 10/2009 | Inoue |
| 2009/0271562 | A1 | 10/2009 | Sinclair |
| 2009/0327603 | A1 | 12/2009 | McKean et al. |
| 2010/0088459 | A1 | 4/2010 | Arya et al. |

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf.

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

* cited by examiner

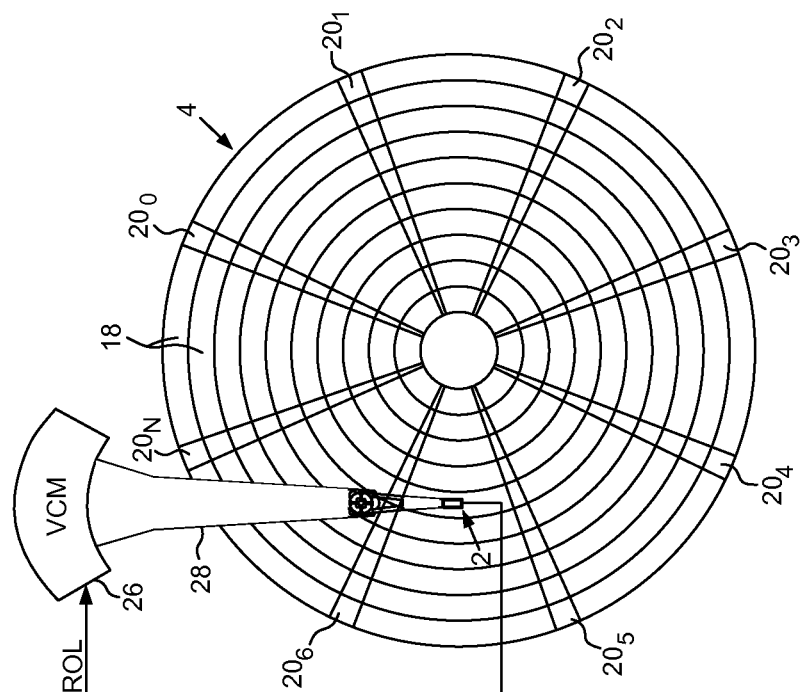
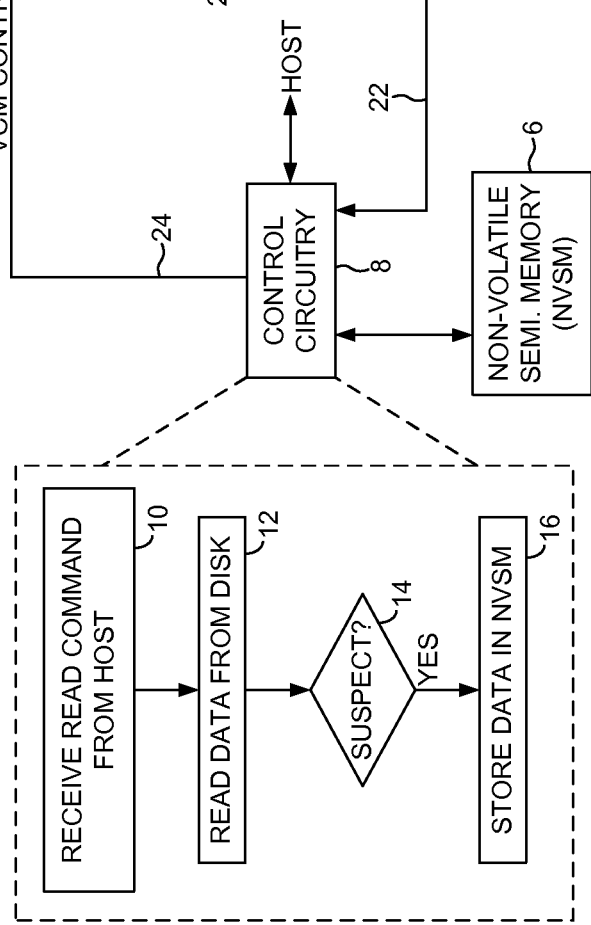

HYBRID DRIVE STORING COPY OF DATA IN NON-VOLATILE SEMICONDUCTOR MEMORY FOR SUSPECT DISK DATA SECTORS

BACKGROUND

Hybrid drives are conventional disk drives augmented with a non-volatile semiconductor memory (NVSM) such as a flash which helps improve certain aspects of the disk drive. For example, the non-volatile semiconductor memory may store boot data in order to expedite the boot operation of a host computer. Another use of a NVSM may be to store frequently accessed data and/or non-sequential data for which the access time is typically much shorter than the disk (which suffers from mechanical latency including seek and rotational latency). Other policies may reduce write amplification of the NVSM in order to maximize its longevity, such as storing frequently written data to the disk (or data having a write/read ratio that exceeds a predetermined threshold).

BRIEF DESCRIPTION OF THE DRAWINGS

FIG. 1A is a hybrid drive according to an embodiment of the present invention comprising a head actuated over a disk and a non-volatile semiconductor memory (NVSM).

FIG. 1B is a flow diagram according to an embodiment of the present invention wherein when a data sector is determined to be suspect during a read operation, data read from the data sector is stored in the NVSM.

DETAILED DESCRIPTION OF EMBODIMENTS OF THE INVENTION

Figure 2:
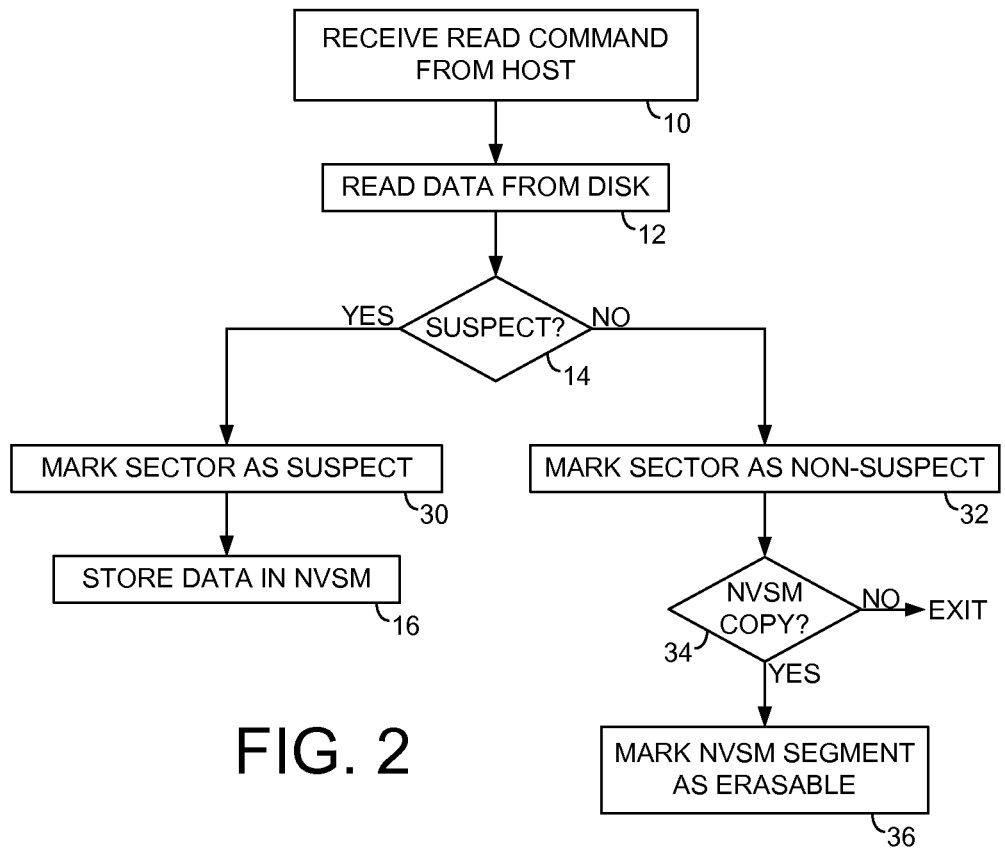
FIG. 2 is a flow diagram according to an embodiment of the present invention wherein suspect data sectors are marked as suspect or non-suspect during a read operation.

FIG. 1A shows a hybrid drive according to an embodiment of the present invention comprising a head 2 actuated over a disk 4 comprising a plurality of data sectors, and a non-volatile semiconductor memory (NVSM) 6 comprising a plurality of memory segments. The hybrid drive further comprises control circuitry 8 operable to execute the flow diagram of FIG. 1B wherein when a read command is received from a host to read data from a first data sector (step 10), data is read from the first data sector during a first read operation (step 12) and a determination is made as to whether the first data sector is suspect (step 14). When the first data sector is suspect (step 14), the data is written to a first memory segment of the NVSM (step 16).

In the embodiment of FIG. 1A, any suitable NVSM 6 may be employed, such as any suitable electrically erasable/programmable memory (e.g., a flash memory). In one embodiment, the NVSM comprises a plurality of blocks, where each block comprises a plurality of memory segments referred to as pages and each page may store one or more data sectors. The blocks are programmed a page at a time, and an entire block is erased in a unitary operation. In one embodiment, a garbage collection operation may be executed on previously written blocks in order to copy valid pages to new blocks (and/or to the disk) so that the previously written blocks may be erased and re-used.

The disk 4 shown in the embodiment of FIG. 1A comprises a plurality of servo sectors $20_0$-$20_N$ that define data tracks 18, where each data track comprises a plurality of the data sectors. The control circuitry 8 processes a read signal 22 emanating from the head 2 to demodulate the servo sectors $20_0$-$20_N$ into a position error signal (PES) representing a position error of the head relative to a target data track. The control circuitry 8 comprises a servo compensator for filtering the PES to generate a control signal 24 applied to a voice coil motor (VCM) 26 that rotates an actuator arm 28 about a pivot in order to actuate the head 2 radially over the disk 4 in a direction that reduces the PES.

The control circuitry 8 may determine that a data sector on the disk is suspect at step 14 of FIG. 1B in any suitable manner. In one embodiment, a data sector may be deemed suspect based on a number of correctable error correction code (ECC) errors detected during a read operation. In another embodiment, a data sector may be deemed suspect when a retry operation is required to recover a data sector. The retry operation may adjust parameters of a read channel in order to increase the signal-to-noise ratio so that the data sector becomes recoverable. When data of a suspect data sector is recovered, the data is stored in the NVSM to provide a redundant copy in the event the data sector continues to degrade.

FIG. 2 is a flow diagram according to an embodiment of the present invention wherein when a data sector is determined to be suspect (step 14) during a read operation, the data sector is marked as suspect (step 30) and the data stored in a memory segment of the NVSM (step 16). If a data sector read during a read operation is determined to be non-suspect (step 14), the data is marked as non-suspect (step 32), and if a copy of the data is stored in the NVSM (step 34), the corresponding memory segment of the NVSM is marked as erasable (step 36). In this manner the memory segment may be erased, for example, during a wear leveling algorithm which attempts to spread out writes to the memory segments of the NVSM evenly so that the memory segments wear out together.

Figure 3:
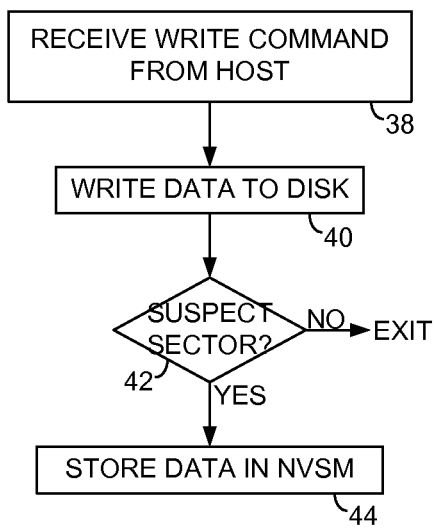
FIG. 3 is a flow diagram according to an embodiment of the present invention wherein when data is written to a suspect data sector a copy of the data is stored in the NVSM.

FIG. 3 is a flow diagram according to an embodiment of the present invention wherein when a write command is received from the host (step 38), data of the write command is written to a data sector on the disk (step 40). If the data sector has been previously marked as suspect (step 42), the data of the write command is also written to the NVSM (step 44) to provide a redundant copy in the event the data sector is unrecoverable.

Figure 4A:
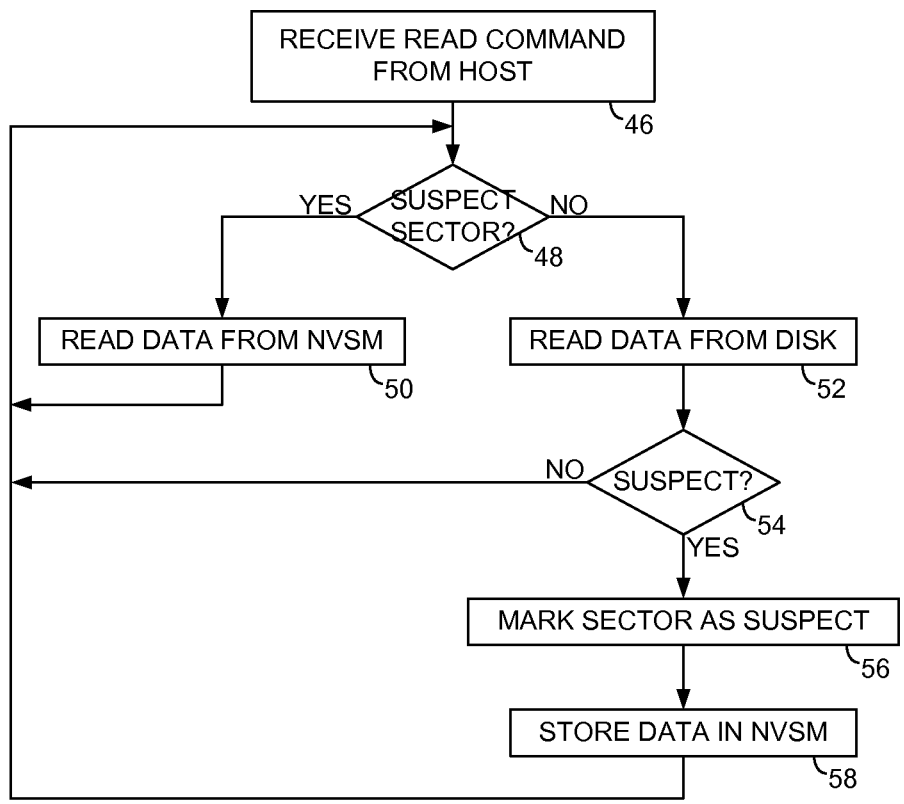
FIGS. 4A and 4B show an embodiment of the present invention wherein when a read command is received to read a plurality of data sectors, suspect data sectors are read from the NVSM.
Figure 4B:
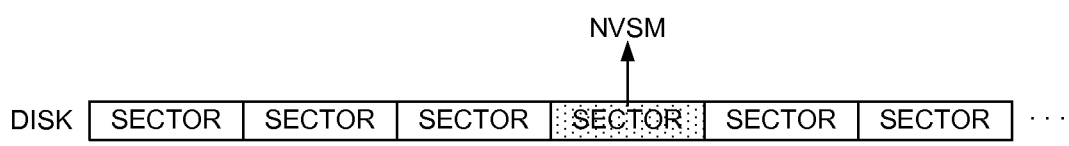

FIG. 4A is a flow diagram according to an embodiment of the present invention wherein a read command is received from a host (step 46) to read a plurality of data sectors on the disk (e.g., a plurality of consecutive data sectors shown in FIG. 4B). During the read operation, if one or more of the data sectors are suspect (step 48) the data is instead read from the NVSM (step 50), otherwise the data is read from the data sector on the disk (step 52). If a data sector read from the disk is determined to be suspect (step 54), the data sector is marked as suspect (step 56) and a copy of the data stored in the NVSM (step 58). In one embodiment, the data from suspect data sectors may be read from the NVSM concurrently while reading data from non-suspect data sectors on the disk. This embodiment helps maximize throughput by avoiding the delay associated with encountering an unrecoverable data sector on the disk.

Figure 5:
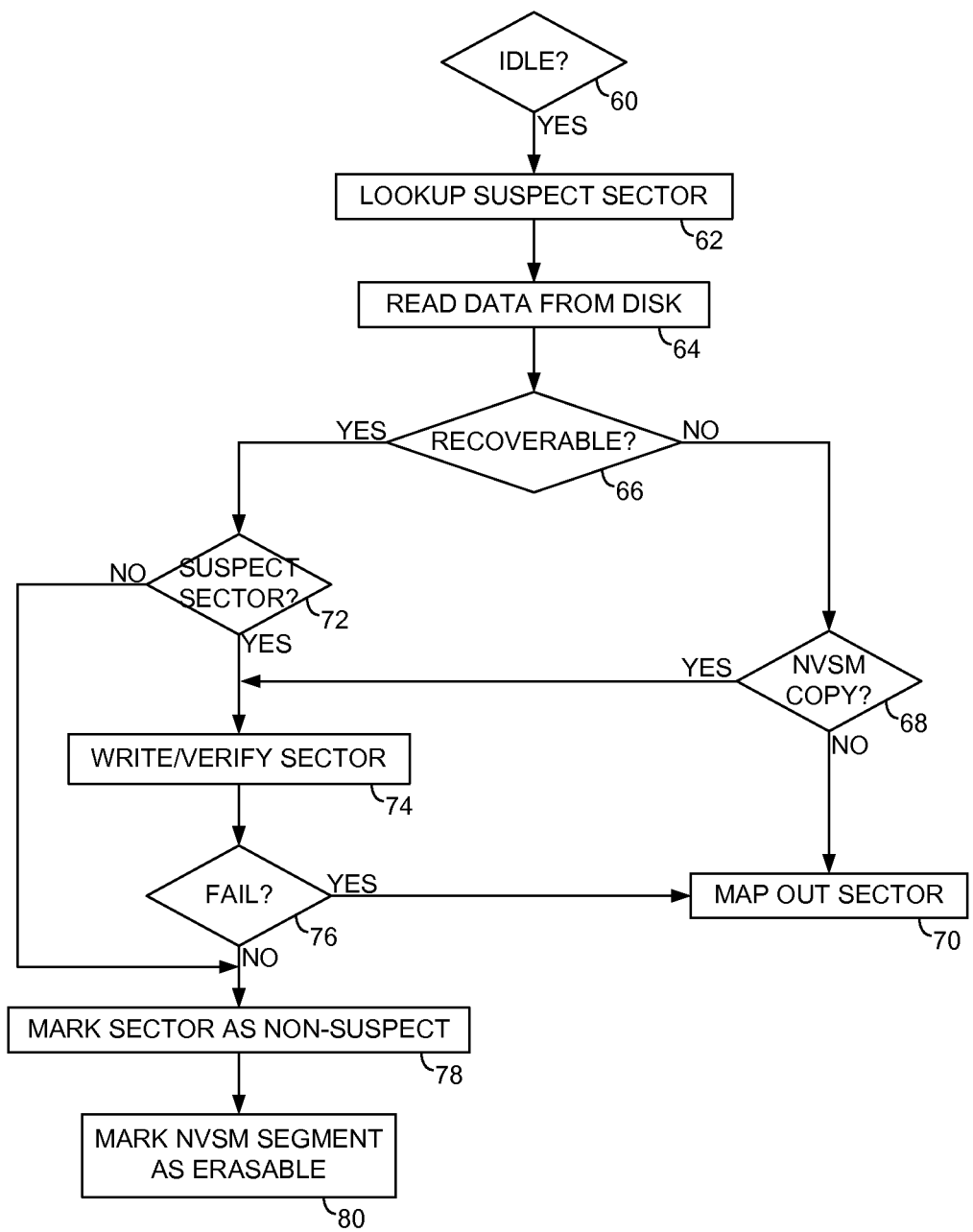
FIG. 5 is a flow diagram according to an embodiment of the present invention wherein during an idle mode of the hybrid drive suspect data sectors are evaluated and mapped out if unrecoverable.

In one embodiment, when a suspect data sector is encountered, it is added to a suspect sector list for evaluation at a later time. This embodiment is shown in the flow diagram of FIG. 5 wherein during an idle mode of the hybrid drive (step 60) a data sector in the suspect sector list (step 62) is read (step 64) to determine whether the data sector is still suspect. If the data sector is unrecoverable after multiple retries (step 66), and a copy of the data is not stored in the NVSM (step 68), then the data sector is deemed defective and mapped out (step 70). If there is a copy of the data in the NVSM (step 68), then the data sector is rewritten and verified (step 74). If the data sector is recoverable (step 66), but still suspect (step 72), then data sector is rewritten and verified (step 74). If the data sector fails the write/verify operation (step 76), the data sector is deemed defective and mapped out (step 70). In one embodiment, the data sector may be written and verified multiple times at step 74 to ensure it is truly defective before being mapped out at step 70. If the data sector is no longer suspect (or passes the write/verify at step 74), then the data sector is marked as non-suspect (step 78) and if there is a copy of the data in the NVSM, the corresponding memory segment of the NVSM is marked as erasable (step 80).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller and/or NVSM controller, or certain steps described above may be performed by a read channel and others by a disk controller and/or NVSM controller. In one embodiment, the read channel and controllers are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the hybrid drive is powered on. In yet another embodiment, the control circuitry comprises suitable logic circuitry, such as state machine circuitry.

What is claimed is:

1. A hybrid drive comprising:
a disk comprising a plurality of data sectors;
a head actuated over the disk;
a non-volatile semiconductor memory (NVSM) comprising a plurality of memory segments; and
control circuitry operable to:
receive a read command from a host to read first data from a first data sector;
read the first data from the first data sector during a first read operation and determine whether the first data sector is suspect; and
when the first data sector is suspect, write the first data to a first memory segment of the NVSM and mark the first data sector as suspect,
wherein after writing the first data to the NVSM the control circuitry is further operable to:
read the first data from the first data sector during a second read operation and determine whether the first data sector is still suspect; and
when the first data sector is no longer suspect, mark the first data sector as non-suspect and mark the first segment of the NVSM as erasable.

2. The hybrid drive as recited in claim 1, wherein the control circuitry is further operable to determine that the first data sector is suspect based on a number of correctable error correction code (ECC) errors detected.

3. The hybrid drive as recited in claim 1, wherein the control circuitry is further operable to determine that the first data sector is suspect when a retry operation is required to recover the first data from the first data sector.

4. The hybrid drive as recited in claim 1, wherein the control circuitry is further operable to:
receive a write command from the host to write second data to the first data sector;
write the second data to the first data sector; and
when the first data sector is marked as suspect, write the second data to a second memory segment of the NVSM.

5. The hybrid drive as recited in claim 1, wherein the control circuitry is further operable to erase the first segment of the NVSM when executing a wear leveling algorithm for the NVSM.

6. The hybrid drive as recited in claim 1, wherein the control circuitry is further operable to execute the second read operation during an idle mode.

7. The hybrid drive as recited in claim 1, wherein when the first data sector is still suspect, the control circuitry is further operable to:
read the first data from the first memory segment of the NVSM;
write the first data to the first data sector; and
read the first data from the first data sector during a third read operation and determine whether the first data sector is still suspect.

8. The hybrid drive as recited in claim 7, wherein when the first data sector is still suspect after the third read operation, the control circuitry is further operable to map out the first data sector.

9. The hybrid drive as recited in claim 1, wherein when the first data sector is still suspect after the second read operation, the control circuitry is further operable to map out the first data sector.

10. A method of operating a hybrid drive comprising a head actuated over a disk comprising a plurality of data sectors, and a non-volatile semiconductor memory (NVSM) comprising a plurality of memory segments, the method comprising:
receiving a read command from a host to read first data from a first data sector;
reading the first data from the first data sector during a first read operation and determine whether the first data sector is suspect; and
when the first data sector is suspect, writing the first data to a first memory segment of the NVSM and marking the first data sector as suspect,
wherein after writing the first data to the NVSM, further comprising:
reading the first data from the first data sector during a second read operation and determine whether the first data sector is still suspect; and
when the first data sector is no longer suspect, marking the first data sector as non-suspect and marking the first segment of the NVSM as erasable.

11. The method as recited in claim 10, further comprising determining that the first data sector is suspect based on a number of correctable error correction code (ECC) errors detected.

12. The method as recited in claim 10, further comprising determining that the first data sector is suspect when a retry operation is required to recover the first data from the first data sector.

13. The method as recited in claim 10, further comprising:
receiving a write command from the host to write second data to the first data sector;
writing the second data to the first data sector; and
when the first data sector is marked as suspect, writing the second data to a second memory segment of the NVSM.

14. The method as recited in claim 13, wherein after writing the second data to the NVSM, further comprising:
reading the second data from the first data sector during a second read operation and determine whether the first data sector is still suspect; and
when the first data sector is no longer suspect, marking the first data sector as non-suspect and marking the first segment of the NVSM as erasable.

15. The method as recited in claim 14, further comprising erasing the first segment of the NVSM when executing a wear leveling algorithm for the NVSM.

16. The method as recited in claim 14, further comprising executing the second read operation during an idle mode.

17. The method as recited in claim 14, wherein when the first data sector is still suspect, further comprising:
reading the data from the first memory segment of the NVSM;
writing the data to the first data sector; and
reading the data from the first data sector during a third read operation and determining whether the first data sector is still suspect.

18. The method as recited in claim 17, wherein when the first data sector is still suspect after the third read operation, further comprising mapping out the first data sector.

19. The method as recited in claim 14, wherein when the first data sector is still suspect after the second read operation, further comprising mapping out the first data sector.

20. A hybrid drive comprising:
a disk comprising a plurality of data sectors;
a head actuated over the disk;
a non-volatile semiconductor memory (NVSM) comprising a plurality of memory segments; and
control circuitry operable to:
receive a read command from a host to read first data from a first data sector;
read the first data from the first data sector during a first read operation and determine whether the first data sector is suspect;
when the first data sector is suspect, write the first data to a first memory segment of the NVSM;
mark the first data sector as suspect;
receive a write command from the host to write second data to the first data sector;
write the second data to the first data sector; and
when the first data sector is marked as suspect, write the second data to a second memory segment of the NVSM.

21. A method of operating a hybrid drive comprising a head actuated over a disk comprising a plurality of data sectors, and a non-volatile semiconductor memory (NVSM) comprising a plurality of memory segments, the method comprising:
receiving a read command from a host to read first data from a first data sector;
reading the first data from the first data sector during a first read operation and determine whether the first data sector is suspect; and
when the first data sector is suspect, writing the first data to a first memory segment of the NVSM;
marking the first data sector as suspect;
receiving a write command from the host to write second data to the first data sector;
writing the second data to the first data sector; and
when the first data sector is marked as suspect, writing the second data to a second memory segment of the NVSM.

* * * * *